Patented Feb. 21, 1928.

1,660,003

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing. Application filed December 31, 1926. Serial No. 158,411.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines, dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion to the action of a demulsifying agent consisting of a mixture comprising a condensation product derived from an organic fatty body and a non-hydroxy-mono-cyclic aromatic, so as to cause the emulsion to break and separate into its component parts of oil and water or brine when the emulsion is permitted to remain in a quiescent state after treatment. The expression "condensation product" has been used because the chemical reactions involved in part contemplate dehydration as is illustrated in the formation of an ester or a lactone.

In practicing my process a treating agent or demulsifying agent of the kind mentioned is brought in contact with the emulsion either by introducing the treating agent into the well in which the emulsion is produced, introducing the treating agent into a conduit through which the emulsion is flowing, introducing the treating agent into a tank in which the emulsion is stored or introducing the treating agent into a container that holds a sludge obtained from the bottom of an old storage tank. In some instances it may be advisable to introduce the treating agent into a producing well in such a way that it will become mixed with water and oil that is emerging from the surrounding strata, before said water and oil enter the barrel of the well pump or the tubing up through which said water and oil flow to the surface of the ground. After treatment the emulsion is allowed to stand in a quiescent state at a suitable temperature so as to permit the water or brine to separate from the oil, or the treated emulsion may be acted upon by one or the other of the various kinds of apparatus now used in the operation of breaking petroleum emulsions, such as homogenizers, hay tanks, gun barrels, filters, centrifuges or electrical dehydrators.

In producing the demulsifying agent contemplated by my process the detergent-forming acid that is used may be any suitable organic fatty body such as oleic acid or ricinoleic acid which combines with alkali to produce a soap or soap-like detergent. The non-hydroxy-mono-cyclic aromatic that is used in producing the demulsifying agent contemplated by my process may be benzene, toluene, zylene, etc. The method of producing the condensation product is the same as is employed in producing "Twitchell" reagents for fat splitting, i. e., subjecting the mixture to the action of a sulphonating agent with subsequent washing. The mass so obtained may be neutralized so as to produce a water soluble salt, such as the ammonia salt, or a water insoluble salt, such as the calcium or magnesium, or it may be converted into an ester, such as the ethyl ester, or it may be used as the acid mass. One procedure that can be used to produce the demulsifying agent contemplated by my process is as follows: 300 parts, by weight, of oleic acid are mixed with 100 parts, by weight, of benzene. This mixture is sulphonated with 600 parts, by weight, of 66 degree Bé. sulphuric acid, and after permitting the mass to stand for about 10 days, it is washed with 50% of its volume of water. After separation into two layers, the upper layer of acid reagent is then drawn off and neutralized with ammonia. The product which results from procedure of the kind above described consists of a mixture comprising a condensation product of a fatty body and a non-hydroxy-mono-cyclic aromatic group, and other complex bodies. While these complex bodies cannot be readily identified, this is immaterial because this type of reaction uniformly yields about the same kind of complex bodies which are usually present in substantially the same amounts. When a petroleum emulsion of the water-in-oil type is subjected to the action of a condensation product of the kind above described, the emulsion will break and separate into its component parts of oil and water or brine when the emulsion is permitted to remain in a quiescent state after treatment.

Having thus described my invention, what I claim as new and desire to secure by Letters Patent is:

1. A process for breaking petroleum emulsions, characterized by subjecting the emulsion to the action of a demulsifying agent consisting of a mixture comprising a condensation product of a fatty body and a non-hydroxy-mono-cyclic aromatic group, and other complex bodies.

2. A process for breaking petroleum emulsions, characterized by subjecting the emulsion to the action of a demulsifying agent consisting of a mixture comprising a salt of a condensation product of a fatty body and a non-hydroxy-mono-cyclic aromatic group, and other complex bodies.

3. A process for breaking petroleum emulsions, characterized by subjecting the emulsion to the action of a demulsifying agent consisting of a mixture comprising a water soluble salt of a condensation product of a fatty body and a non-hydroxy-mono-cyclic aromatic group, and other complex bodies.

4. A process for breaking petroleum emulsions, characterized by subjecting the emulsion to the action of a demulsifying agent consisting of a mixture comprising an ammonium salt of a condensation product of a fatty body and a non-hydroxy-mono-cyclic aromatic group, and other complex bodies.

MELVIN DE GROOTE.